United States Patent
Thakkar et al.

(10) Patent No.: US 10,757,170 B2
(45) Date of Patent: Aug. 25, 2020

(54) CROSS-CLOUD NAMESPACE MANAGEMENT FOR MULTI-TENANT ENVIRONMENTS

(71) Applicant: VMWARE, INC., Palo Alto, CA (US)

(72) Inventors: Sachin Thakkar, Palo Alto, CA (US); Debashis Basak, Palo Alto, CA (US); Serge Maskalik, Palo Alto, CA (US); Weiqing Wu, Palo Alto, CA (US); Aravind Srinivasan, Pune (IN)

(73) Assignee: VMware, Inc., Palo Alto, CA (US)

( * ) Notice: Subject to any disclaimer, the term of this patent is extended or adjusted under 35 U.S.C. 154(b) by 807 days.

(21) Appl. No.: 14/664,939

(22) Filed: Mar. 23, 2015

(65) Prior Publication Data

US 2016/0105393 A1  Apr. 14, 2016

Related U.S. Application Data

(60) Provisional application No. 62/063,280, filed on Oct. 13, 2014.

(30) Foreign Application Priority Data

Dec. 31, 2014 (IN) .......................... 6855/CHE/2014

(51) Int. Cl.
*H04L 29/08* (2006.01)
*H04L 12/24* (2006.01)
(Continued)

(52) U.S. Cl.
CPC .......... *H04L 67/10* (2013.01); *H04L 41/0823* (2013.01); *H04L 61/2596* (2013.01);
(Continued)

(58) Field of Classification Search
CPC ....................................................... H04L 67/10
(Continued)

(56) References Cited

U.S. PATENT DOCUMENTS 8,194,674 B1 * 6/2012 Pagel .................. H04L 12/4641
370/393
9,152,449 B2 * 10/2015 Deng .................. G06F 9/45558
(Continued)

OTHER PUBLICATIONS

Office Action: U.S. Appl. No. 14/664,952 dated Apr. 11, 2017 consists of 6 pages.

*Primary Examiner* — Sm A Rahman
*Assistant Examiner* — Emad Siddiqi
(74) *Attorney, Agent, or Firm* — Loza & Loza, LLP

(57) ABSTRACT

Conditional address translation is performed in a multi-tenant cloud infrastructure to effectively support tenant-assigned addresses. For each tenant, the multi-tenant cloud infrastructure deploys both a private network used to communicate between the tenant and the cloud and a tenant-facing gateway to manage the private network. The multi-tenant cloud infrastructure also includes an externally-facing gateway used to communicate between the multi-tenant cloud and a public network. The tenant-facing gateways are configured to bypass address translation—providing consistent addressing across each private network irrespective of the physical location of resources linked by the private network. By contrast, the public-facing gateway is configured to translate source addresses in outgoing packets to addresses that are unique within the public network. Advantageously, discriminately mapping addresses enables multiple tenants to interact in a uniform fashion with both on-premises resources and cloud-hosted resources without incurring undesirable address collisions between tenants.

17 Claims, 6 Drawing Sheets

(51) Int. Cl.
 *H04L 29/12* (2006.01)
 *H04L 29/06* (2006.01)
(52) U.S. Cl.
 CPC ...... *H04L 61/6022* (2013.01); *H04L 67/1097* (2013.01); *H04L 67/125* (2013.01); *H04L 67/42* (2013.01); *H04L 61/2038* (2013.01); *H04L 61/2061* (2013.01)
(58) Field of Classification Search
 USPC .......................................................... 709/220
 See application file for complete search history.

(56) References Cited

U.S. PATENT DOCUMENTS

| | | | | | |
|---|---|---|---|---|---|
| 2013/0268643 | A1* | 10/2013 | Chang | ................. | G06F 9/45558 709/223 |
| 2013/0279519 | A1* | 10/2013 | Lu | ...................... | H04L 61/2514 370/467 |
| 2015/0067112 | A1* | 3/2015 | Gokhale | ............. | H04L 41/0809 709/220 |
| 2015/0188802 | A1* | 7/2015 | Yoon | ....................... | H04L 45/64 709/238 |
| 2015/0281059 | A1* | 10/2015 | Xiao | ....................... | H04L 45/74 709/238 |
| 2015/0363276 | A1* | 12/2015 | Banerjee | ............... | G06F 11/203 714/4.11 |
| 2016/0105393 | A1* | 4/2016 | Thakkar | .............. | H04L 41/0823 709/220 |

* cited by examiner

CROSS-CLOUD NAMESPACE MANAGEMENT FOR MULTI-TENANT ENVIRONMENTS

CROSS-REFERENCE TO RELATED APPLICATION(S)

This application claims the benefit of U.S. Provisional Patent Application No. 62/063,280, filed Oct. 13, 2014 and entitled "CROSS CLOUD NAMESPACE MANAGEMENT FOR MULTI-TENANT ENVIRONMENTS," and also under 35 U.S.C. 119(a)-(d) to Foreign application Serial No. 6855/CHE/2014 filed in India entitled "CROSS-CLOUD NAMESPACE MANAGEMENT FOR MULTI-TENANT ENVIRONMENTS," on Dec. 31, 2014 VMware, Inc., the entire contents of which are incorporated by reference herein.

This application is also related to U.S. patent application Ser. No. 14/664,952, entitled "Central Namespace Controller for Multi-Tenant Cloud Environments", which is assigned to the assignee of this application and has been filed on the same day as this application.

BACKGROUND

Cloud architectures are used in cloud computing and cloud storage systems for offering infrastructure-as-a-service (IaaS) cloud services. Examples of cloud architectures include the VMware vCloud™ Director cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs such as virtual machines (VMs) and logical networks. However, the use of such public cloud services is typically kept separate from the use of existing computing resources in data centers managed by an enterprise (i.e., private data centers).

By contrast, in "hybrid" cloud computing systems, public cloud services and existing computing resources in private data centers are combined. Further, a public cloud service may model support for multiple tenants with private data centers as a hub-and-spoke. In such a model, the public cloud service strives to integrate each independent tenant (spoke) seamlessly into the public cloud environment (hub), while maintaining "secure separation" between tenants. More specifically for each tenant, the pubic cloud environment provides access to tenant-assigned resources (e.g., virtual machines (VMs), network bandwidth, and storage) and prevents access to resources assigned to other tenants. In an attempt to provide comprehensive secure separation, the public cloud environment may employ a variety of techniques, such as access control, virtual local area network (VLAN) segmentation, and virtual storage controllers.

While conventional secure separation techniques may enable adequate separation of tenants, such techniques do not necessarily alleviate addressing conflicts due to the merging of multiple, potentially overlapping namespaces. Notably, unlike physical NICs which are assigned unique MAC addresses when the NIC is manufactured, each tenant may assign MAC addresses to virtual NICs in any technically feasible fashion. Further, to provide seamless integration between each tenant and the public cloud environment, particularly across Level 2 networks, it is desirable to preserve the MAC address when migrating a VM from the tenant data center to the public cloud environment. In a multi-tenant hybrid cloud system, maintaining MAC consistency across the tenants may cause duplicate MAC addresses to exist in the public cloud environments. For example, if a tenant "A" were to migrate a VM with MAC address "X" to the public cloud environment and then tenant "B" were to migrate a different VM with the same MAC address "X" to the public cloud, then two different VMs with the same MAC addresses would be created in the public cloud environment. If allowed to interact within the public cloud environment, VMs with duplicate MAC addresses can lead to a variety of undesirable behavior, such as destination host unreachable errors attributable to MAC address collisions between tenants. Consequently, there is a need for more effective address management techniques that ensure seamless integration without provoking addressing conflicts.

SUMMARY

One or more embodiments of the invention provide techniques for flexibly managing addresses across hybrid clouds. These techniques facilitate seamless integration of multiple private tenant data centers with a public cloud and/or seamless integration of multiple public clouds into a distributed cloud infrastructure, without provoking addressing conflicts attributable to the integration(s).

A method of supporting independent addressing for multiple tenants in a cloud computing system includes the steps of for each tenant, configuring a private network between the tenant and the cloud computing system, where the private network is managed by a tenant-facing cloud gateway; configuring the tenant-facing cloud gateways to preserve the source addresses of packets originating from the cloud computing system; and configuring a multi-tenant cloud gateway to a public network to translate the source addresses of packets originating from the cloud computing system to addresses that are unique within the public network.

A method of allocating addresses on-demand in a distributed cloud infrastructure includes the steps of receiving a request to allocate addresses for a network to be provisioned by a cloud computing system and, in response, allocating a network address and a virtual network interface card (NIC) address range, where the network address is unique within a distributed cloud namespace and the addresses in the virtual NIC address range are unique within the network; and receiving a request to allocate an address for a virtual NIC to be created by the cloud computing system on the network and, in response, allocating a first virtual NIC address, where the first virtual NIC address is within the first virtual NIC address range and is unique within the first network.

Further embodiments of the present invention include a non-transitory computer-readable storage medium comprising instructions that cause a hybrid cloud computing system to carry out one or more of the above methods as well as a distributed cloud infrastructure configured to carry out one or more of the above methods.

DETAILED DESCRIPTION

Figure 1:
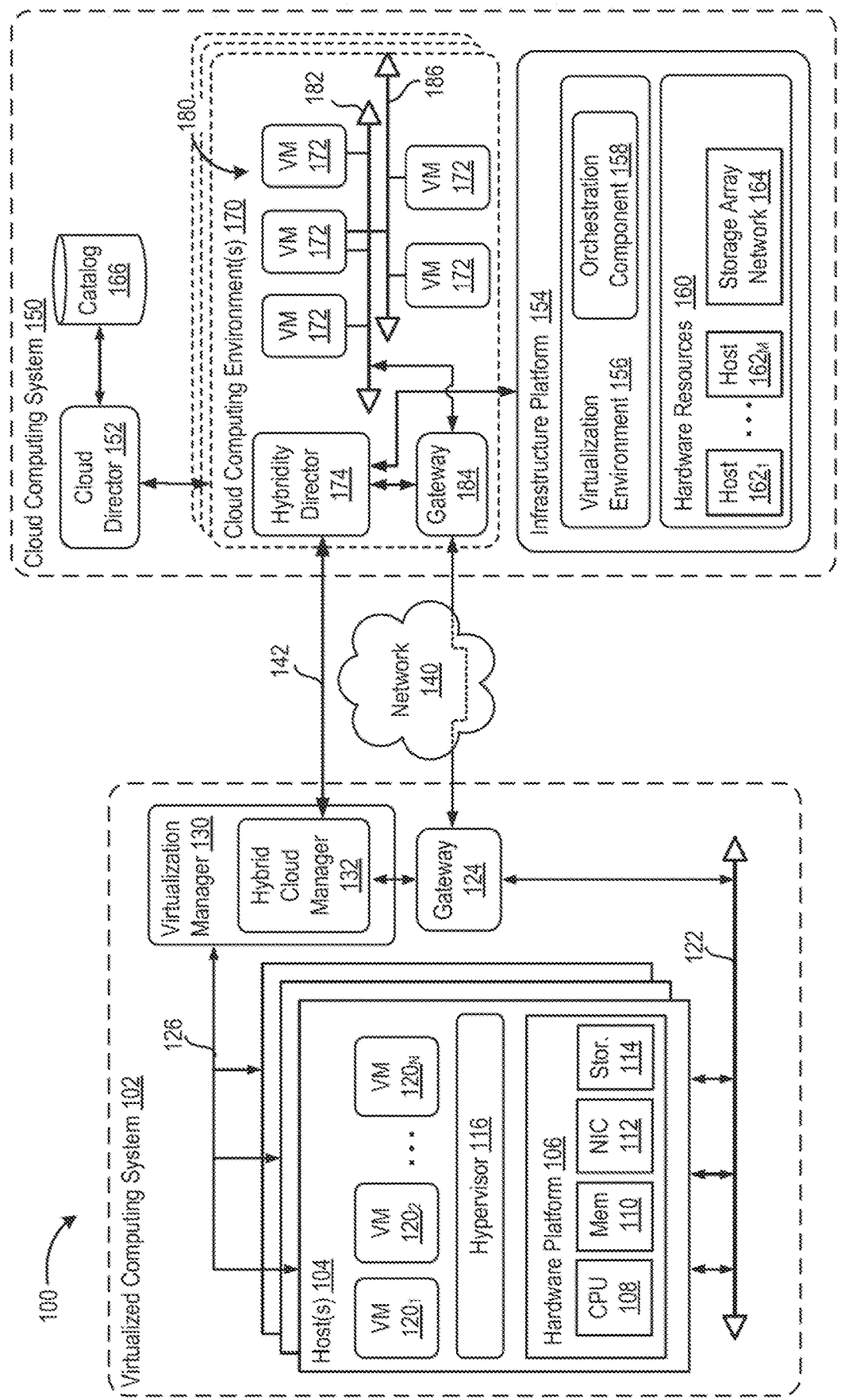
FIG. 1 is a block of a hybrid cloud computing system in which one or more embodiments of the present disclosure may be utilized.

FIG. 1 is a block diagram of a hybrid cloud computing system 100 in which one or more embodiments of the present disclosure may be utilized. Hybrid cloud computing system 100 includes a virtualized computing system 102 and a cloud computing system 150, and is configured to provide a common platform for managing and executing virtual workloads seamlessly between virtualized computing system 102 and cloud computing system 150. In one embodiment, virtualized computing system 102 may be a data center controlled and administrated by a particular enterprise or business organization, while cloud computing system 150 is operated by a cloud computing service provider and exposed as a service available to account holders, such as the particular enterprise in addition to other enterprises. As such, virtualized computing system 102 may sometimes be referred to as an on-premise data center(s), and cloud computing system 150 may be referred to as a "public" cloud service. In some embodiments, virtualized computing system 102 itself may be configured as a private cloud service provided by the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Virtualized computing system 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules.

Network interface 112 enables host 104 to communicate with another device via a communication medium, such as a network 122 within virtualized computing system 102. Network interface 112 may be one or more network adapters, also referred to as a Network Interface Card (NIC). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere solution made commercially available from VMware, Inc. Hypervisor 116 may run on top of the operating system of host 104 or directly on hardware components of host 104.

Virtualized computing system 102 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in virtualized computing system 102, or alternatively, running as a VM in one of hosts 104. One example of a virtualization management module is the vCenter® Server product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtual computing resources provided by cloud computing system 150 with virtual computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative task, as described in greater detail later. In one implementation, hybrid cloud manager 132 is a module or plug-in complement to virtualization manager 130, although other implementations may be used, such as a separate computer program executing in a central server or running in a VM in one of hosts 104.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in virtualized computing system 102 with connectivity to an external network 140 (e.g., Internet). Gateway 124 may manage external public IP addresses for VMs 120 and route traffic incoming to and outgoing from virtualized computing system 102 and provide networking services, such as firewalls, network address translation (NAT), dynamic host configuration protocol (DHCP), load balancing, and virtual private network (VPN) connectivity over a network 140.

In one or more embodiments, cloud computing system 150 is configured to dynamically provide an enterprise (or users of an enterprise) with one or more virtual data centers 180 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtual computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp™ technology made available by VMware, Inc., of Palo Alto, Calif., although other technologies may be utilized. Cloud director 152 receives provisioning requests submitted (e.g., via REST API calls) and may propagate such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct instantiated and managed by a tenant that provides compute, network, and storage resources to that tenant. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., cloud gateway 184), as well as one or more isolated internal networks 186 not connected to cloud gateway 184. Cloud gateway 184 (e.g., executing as a virtual appliance) is configured to provide VMs 172 and other components in cloud computing environment 170 with connectivity to external network 140 (e.g., Internet). Cloud gateway 184 manages external public IP addresses for virtual data center 180 and one or more private internal networks interconnecting VMs 172. Cloud gateway 184 is configured to route traffic incoming to and outgoing from virtual data center 180 and provide networking services, such as firewalls, network address translation (NAT), dynamic host configuration protocol (DHCP), and load balancing. Cloud gateway 184 may be configured to provide virtual private network (VPN) connectivity over a network 140 with another VPN endpoint, such as a gateway 124 within virtualized computing system 102. In other embodiments, cloud gateway 184 may be configured to connect to communicate with virtualized computing system 102 using a high-throughput, dedicated link (depicted as a direct connect 142) between virtualized computing system 102 and cloud computing system 150. In one or more embodiments, gateway 124 and cloud gateway 184 are configured to provide a "stretched" layer-2 (L2)

network that spans virtualized computing system 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in virtualized computing system 102 to enable a common virtualized computing platform between virtualized computing system 102 and cloud computing system 150. Hybridity director 174 (e.g., executing as a virtual appliance) may communicate with hybrid cloud manager 132 using Internet-based traffic via a VPN tunnel established between gateways 124 and 184, or alternatively, using direct connect 142. In one embodiment, hybridity director 174 may control gateway 184 to control network traffic into virtual data center 180. In some embodiments, hybridity director 174 may control VMs 172 and hosts 162 of cloud computing system 150 via infrastructure platform 154.

Although not shown in FIG. 1, cloud computing system 150 may support multiple tenants. Accordingly, hybridity director 174 is configured to enable separate, tenant-specific virtualized computing platforms between each virtualized computing system 102 and cloud computing system 150, while maintaining secure separation between tenants. Hybridity director 174 may employ any technically feasible security and separation measures to implement secure separation. For instance, in some embodiments, hybridity director 174 coordinates access control, virtual local area network (VLAN) segmentation, virtual extensible LAN (VXLAN) identifiers (VNIs) and encapsulation, and virtual storage controllers to enforce secure separation. As used herein, tenants may represent unique customers, independently maintained on-premises virtualized computing systems 102 that are associated with a single customer, or any combination thereof.

Managing Virtual MAC Addresses

For a given tenant, virtualization manager 130 performs on-premises management tasks to support virtualized computing system 102 internally, independently of virtualization managers 130 of other tenants. Such tasks may include provisioning VMs 120, migrating VMs 120 between hosts 104, and allocating physical resources, such as CPU 108 and memory 110. Further, for each VM 120, virtualization manager 130 assigns a MAC address for each virtual network interface controller (NIC) provisioned within VM 120. Notably, unlike physical NICs 112 which are assigned unique MAC addresses 120 when the NIC 112 is manufactured, virtualization manager 130 may assign MAC addresses to virtual NICs in any technically feasible fashion.

Further, for a given tenant, hybrid cloud manager 132 performs cross-cloud management tasks, such as deploying VMs in cloud computing system 150, and migrating VMs from virtualized computing system 102 to cloud computing system 150. Such cross-cloud management tasks involve interaction with a corresponding hybrid cloud manager 132 of a given tenant, and therefore such operations are sometimes referred as "tenant-facing" operations. To provide seamless interaction between VMs 120 and VMs 174, hybrid cloud manager 132 ensures that MAC addresses assigned by virtualization manager 130 are preserved during migration operations.

However, because each conventional MAC address is specified by a limited number of bits (typically 6 eight-bit octets for a total of 48 bits), and each virtualization manager 130 allocates MAC addresses in isolation. MAC addresses assigned by different virtualization managers 130 sometimes overlap. If allowed to interact with each other or co-exist in a common domain such as cloud computing environment 170, duplicate MAC addresses can lead to undesirable behavior attributable to MAC address collisions between tenants. For this reason, cloud computing environment 170 is configured to operate with the tenant-assigned MACs for tenant-facing operations, and translate tenant-assigned MAC addresses to unique MAC addresses when accessing non-tenant specific data or a public network, such as the Internet.

Figure 2:
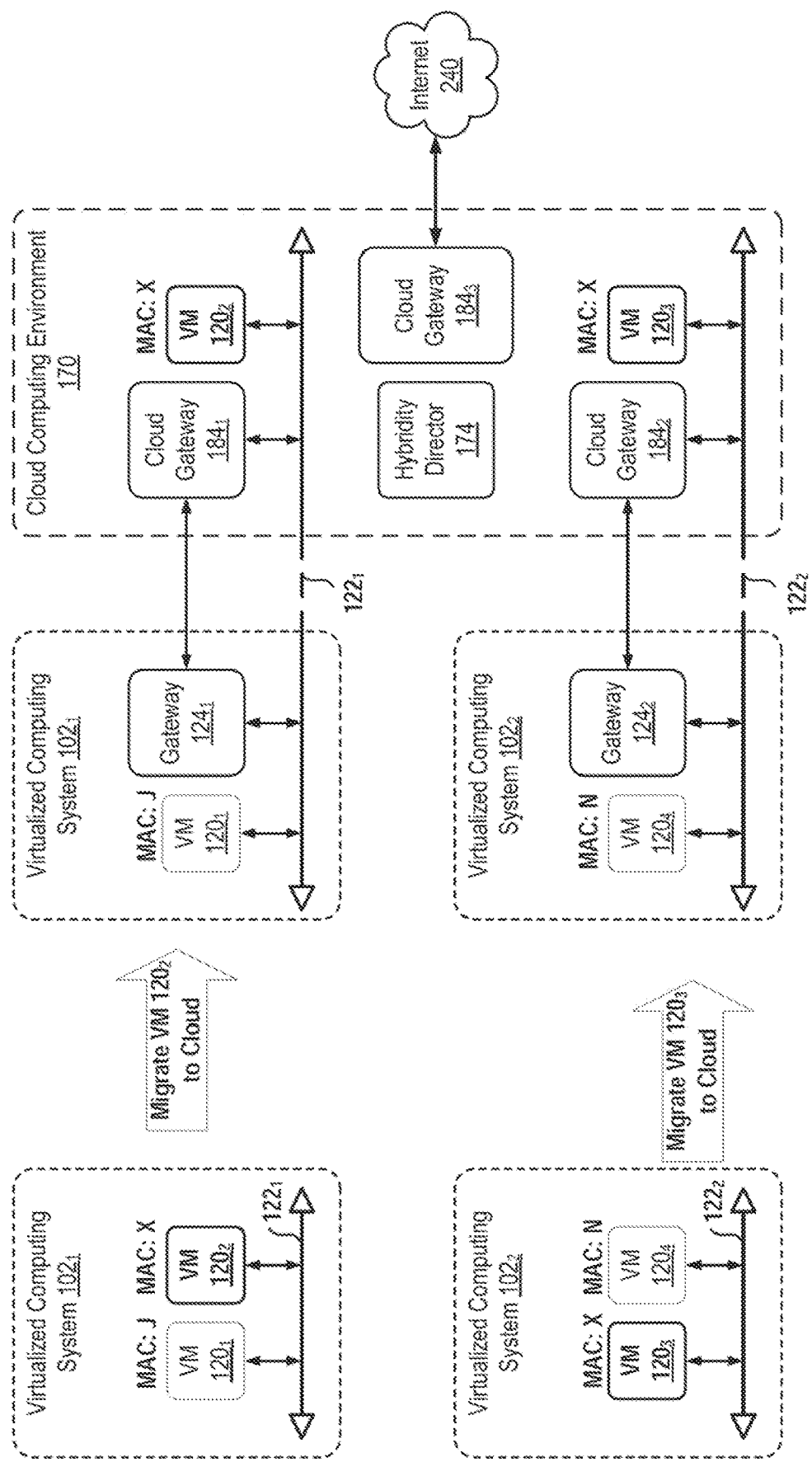
FIGS. 2A and 2B are conceptual block diagrams that illustrate the migration of virtual machines from virtualized computing systems to cloud computing environment.

FIGS. 2A and 2B are conceptual block diagrams that illustrate the migration of virtual machines 120 from virtualized computing systems 102 to cloud computing environment 170. Migrating VMs 120 in this fashion enables virtualized computing systems 102 to add capacity derived from cloud computing system 150 to the capacity of on-premise data centers. Both FIGS. 2A and 2B depict two independent virtualized computing systems $102_1$ and $102_2$. For explanatory purposes only, FIG. 2A depicts virtualized computing system $102_1$ prior to migrating VM $120_2$ to cloud computing environment 170 and virtualized computing system $102_2$ prior to migrating VM $120_3$ to cloud computing environment 170. FIG. 2B depicts cloud computing environment 170 and virtualized computing systems $102_1$ and $102_2$ after migrating, respectively, VM $120_2$ and VM $120_3$ to cloud computing environment 170.

Initially, virtualized computing system $102_1$ is running VM $120_1$ and VM $120_2$ on hosts 104 included in virtualized computing system $102_1$. Independently, virtualized computing system $102_2$ is running VM $120_3$ and VM $120_4$ on hosts 104 included in virtualized computing system $102_2$. As annotated in FIG. 2A, virtualization manager 130 has configured network settings of virtualized computing system $102_1$ such that a virtual network interface (vNIC) of VM $120_1$ has been assigned a MAC address "J," VM $120_2$ has a MAC address "X," and VM $120_1$ and VM $120_2$ communicate via L2 private network $122_1$. As also shown in FIG. 2A, a corresponding virtualization manager has configured network settings within virtualized computing system $102_2$ such that VM $120_3$ has a MAC address "X," VM $120_4$ has a MAC address "N," and VM $120_3$ and VM $120_4$ communicate via L2 private network $122_2$.

To enable seamless migration, hybridity director 174 configures cloud gateway $184_1$ to "stretch" L2 private network $122_1$ from a tenant data center to the multi-tenant cloud site, i.e., span virtualized computing system $102_1$ and cloud computing environment 170. In one implementation, hybridity director 174 may configure gateway $184_1$ to provide virtual private network (VPN) connectivity to gateway $124_1$ within virtualized computing system $102_1$. Similarly, hybridity director 174 configures cloud gateway $184_2$ to provide virtual private network (VPN) connectivity to gateway $124_2$ within virtualized computing system $102_2$, stretching L2 private network $122_2$ to span virtualized computing system $102_2$ and cloud computing environment 170. In other embodiments, hybridity director 174 may use a direct connect 142 between virtualized computing system 102 and cloud computing system 150.

As part of stretching L2 private networks 122, hybridity director 174 ensures that VMs 120 on the same L2 private network 122 are able to interact consistently, irrespective of whether the VM 120 is running on hosts 104 included in virtualized computer system 102 or hosts 162 included in cloud computing system 150. In particular, when migrating VM 120, hybridity director 174 preserves the MAC address of VM 120 assigned by virtualized computing system 102. Consequently, as depicted in FIG. 2B after migrating VM $120_2$ to cloud computing environment 170, VM $120_2$ retains MAC address "X." Advantageously, maintaining MAC addresses "X" enables VM $120_1$ and VM $120_2$ to continue to interact unaware of the migration of VM $120_2$. Similarly, as also depicted in FIG. 2B, after migrating VM $120_3$ to cloud computing environment 170, VM $120_3$ retains MAC address "X," enabling VM $120_3$ and VM $120_4$ to continue to interact unaware of the migration of VM $120_3$.

Since private networks $122_1$ and $122_2$ are isolated from each other, duplicate MAC addresses may co-exist within private networks $122_1$ and $122_2$ without MAC address collisions. For instance, address resolution protocol (ARP) probes on private networks 122, will not interact with VM $120_3$. However, using duplicate MAC address within the common cloud computing environment 170 and outside private networks 122, such as to access non-tenant specific data and communicate with public networks (e.g., the Internet), may cause MAC address collisions that conflate VMs 120 with duplicate MAC addresses. In general, MAC address collisions may cause a variety of undesirable and inconsistent behavior, such as intermittently unreachable destination hosts. Accordingly, embodiments of the present disclosure provide a hybridity director 174 configured to assign a new MAC address for use with non-tenant-facing traffic and conditionally translate between the original tenant-provided MAC addresses and the new MAC addresses based on the destination network, as described in further detail below.

In operation, hybridity director 174 configures cloud gateways 184 to perform conditional network address translations of MACs. More specifically, hybridity director 174 configures tenant-facing cloud gateways 184, such as $184_1$ and $182_2$, to preserve MAC addresses. By contrast, hybridity director 174 configures public-facing gateways 184, such as $184_3$ that connects to Internet 240, to perform address network translation-mapping (potentially duplicate) internal tenant MAC addresses to the MAC addresses assigned by cloud computing system 150 that are unique to public network 122.

Figure 3:
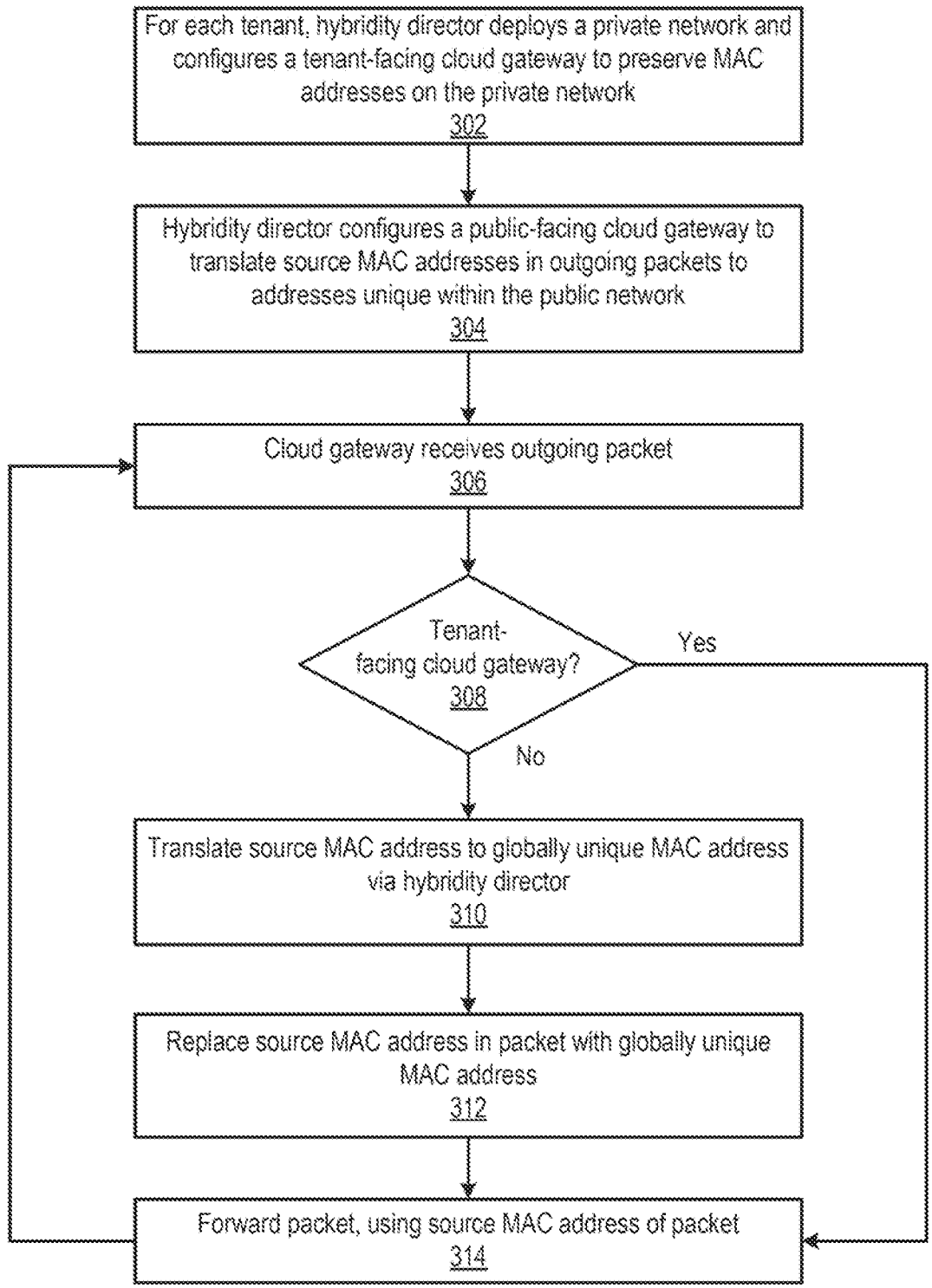
FIG. 3 depicts a flow diagram of method steps for conditionally translating the source media access control (MAC) addresses of packets sent from a multi-tenant cloud computing environment.

FIG. 3 depicts a flow diagram of method steps for conditionally translating the source media access control (MAC) addresses of packets sent from a multi-tenant cloud computing environment. Although the method steps in this flow describe translation of source MAC addresses, corresponding address network translation techniques may be used to recreate the original MAC addresses. Further, the techniques outlined in FIG. 3 may be applied to any type of addresses and may be implemented in any type of addressing scheme to provide isolated, tenant-specific addressing while avoiding addressing conflicts. For example, the techniques outlined in FIG. 3 may be applied to provide namespace management and translation of VLAN identifiers, VXLAN network identifiers (VNIs), and Internet Protocol (IP) addresses.

This method begins at step 302 where, for each tenant, hybridity director 174 deploys private network 122 and configures a tenant-facing cloud gateway 184 to preserve MAC addresses on private network 122. In particular, hybridity director 174 ensures tenant-facing cloud gateways 184 do not perform network address translation for MACs, extending the addressing scheme implemented by virtualized computing system $102_1$ to include tenant-specific VMs 120 that run on hosts 162 in cloud computing system 150.

At step 304, hybridity director 174 configures a public-facing cloud gateway 184 to translate source MAC addresses in outgoing packets to addresses unique within the destination network. Hybridity director 174 may generate, allocate, and maintain unique MAC addresses and the address mappings in any technically feasible fashion. For example, in some embodiments, hybridity director 174 may request a unique address from a central namespace controller. Typically, hybridity director 174 deploys a single public-facing cloud gateway 184, however hybridity director 174 may deploy any number of public-facing cloud gateways 184 and interact with any number of public networks.

At step 306, cloud gateway 184 receives an outgoing packet (i.e., a packet that originates in cloud computing system 150). Cloud gateway 184 then processes the output packet per the configuration applied in step 304 or step 306—performing conditional MAC translation based on the destination network. If at step 308, cloud gateway 184 is a tenant-facing gateway 184 that manages private network 122, then cloud gateway 184 preserves the source MAC address and this method proceeds directly to step 314.

If at step 308, cloud gateway 184 is a public-network facing gateway 184 that communicates with a public network, then this method proceeds to step 310. At step 310, hybridity director 174 translates the source MAC address of the outgoing packet to a MAC address that is globally unique within the public network. After obtaining the translated MAC address, cloud gateway 184 replaces the source MAC address in the packet with the globally unique MAC address and this method proceeds to step 314.

In other embodiments, a cloud gateway 184 performs MAC translation on network packets based on whether the packets' destination network is to private network 222 or to a public network 240 (i.e., Internet). Responsive to determining a packet belongs within private network 222, cloud gateway 184 uses the tenant-provided MAC address in the packet. Otherwise, responsive to determining the packet belongs to public network 240, cloud gateway 184 uses the cloud-assigned MAC address in the packet. In addition to modifying packet fields, cloud gateway 184 may be further configured to respond to address resolution requests (e.g., ARP requests) with the tenant-provided MAC address or the cloud-assigned MAC address based on the source of the ARP request.

At step 314, cloud gateway 184 forwards the packet, using the conditionally-translated source MAC address. This method then returns to step 306, where cloud gateway 184 receives another outgoing packet. Cloud gateway 184 continues to execute steps 306-314, conditionally translating source MAC addresses in outgoing packets based on destination network until cloud gateway 184 receives no more outgoing packets. For explanatory purposes, this method describes method steps 306-314 for a single cloud gateway 184, however any number of cloud gateways 184 may be processing outgoing packets at least partially in parallel using method steps 306-314.

Figure 4:
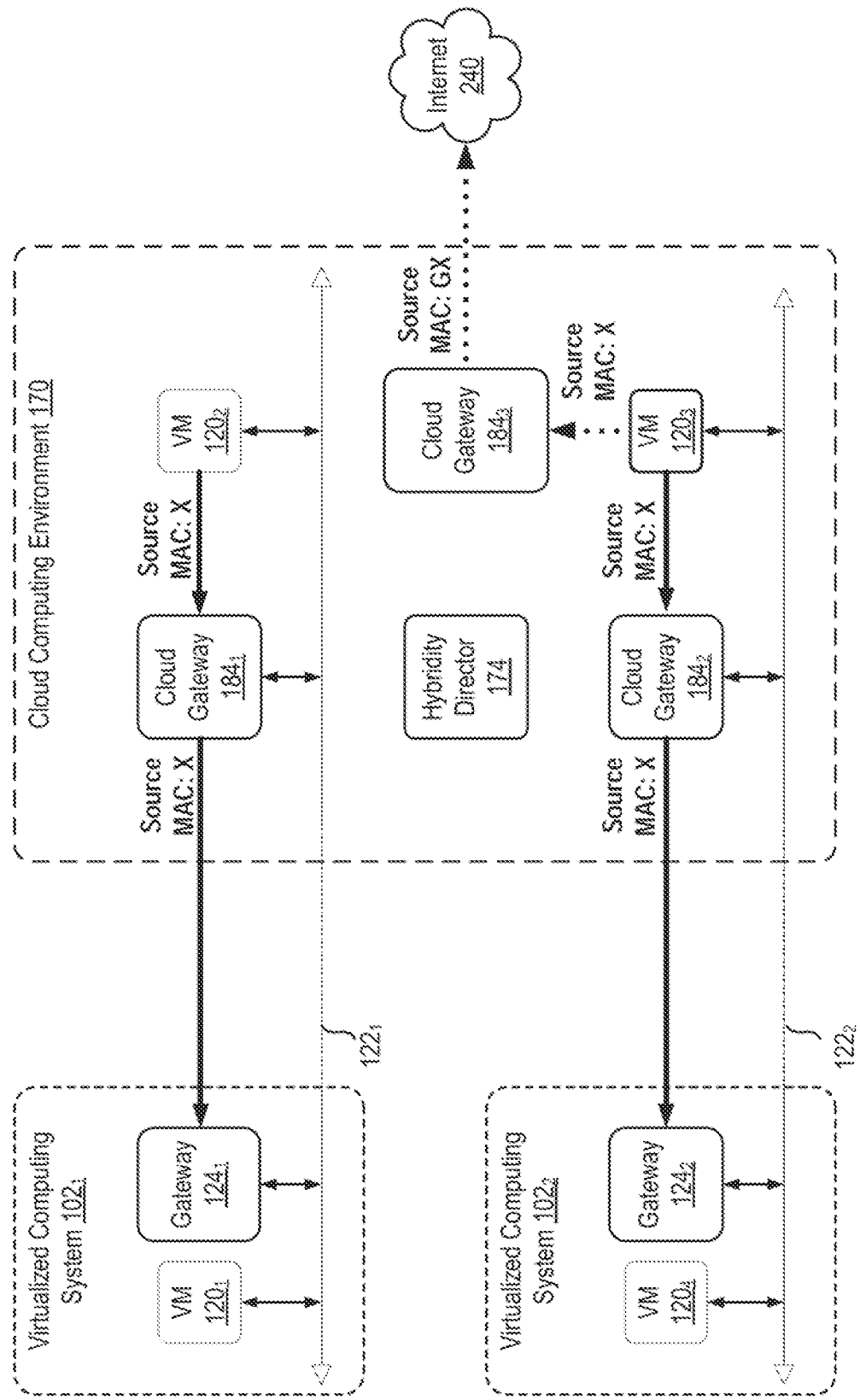
FIG. 4 is a conceptual diagram that illustrates addressing in multi-tenant hybrid cloud computing environment.

FIG. 4 is a conceptual diagram that illustrates addressing in multi-tenant hybrid cloud computing system 100. For explanatory purposes, FIG. 4 depicts selected communication traffic as bold lines with the source MAC addresses of the packets annotated above the bold line. FIG. 4 illustrates the addressing of three separate packets, each of which has the same source MAC address—"X."

As shown, the top-most packet travels from VM $120_2$, hosted in cloud computing environment 170, to VM $120_1$, hosted in virtualized computing system $102_1$. After originating at VM $120_2$ with source MAC address "X" and a destination included in stretched private network $122_1$, the packet passes through cloud gateway $184_1$. Cloud gateway $184_1$ is a tenant-facing gateway and, consequently, is configured to retain MAC address "X" without performing any MAC address translation.

Similarly, the bottom-most packet travels from VM $120_3$, hosted in cloud computing environment 170, to VM $120_4$, hosted in virtualized computing system $102_2$. After originating at VM $120_3$ with source MAC address "X" and a destination included in stretched private network $122_2$, the packet passes through cloud gateway $184_2$. Cloud gateway $184_2$ is a tenant-facing gateway and, consequently, is configured to retain MAC address "X" without performing any MAC address translation.

The middle-most packet travels from VM $120_3$, hosted in cloud computing environment 170, to an Internet 240. After originating at VM $120_3$ with source MAC address "X" and an Internet-facing destination network, the packet passes through cloud gateway $184_2$. Cloud gateway $184_2$ is an Internet-facing gateway and, consequently, is configured to translate MAC address "X" to a MAC address that is unique to Internet 240, shown as MAC address "GX".

In some embodiments, the hub-and-spoke model of a single cloud supporting multiple tenants that is described in FIGS. 1 through 4 is extended to a grid model of multiple clouds, each supporting multiple tenants. More specifically, multiple, geographically disparate cloud computing systems 150 are connected to create a distributed cloud infrastructure. Theoretically, the techniques for managing addressing of multi-tenants described in FIGS. 1 through 4—per-packet, conditional network address translation—may be extended to techniques for managing addressing of multi-tenants with a distributed cloud infrastructure. Such an approach provides seamless integration while preventing address collisions between cloud computing systems 150.

Central Namespace Controller

However, unlike the multi-tenant scenario in which multiple tenants manage addressing independently, often one provider supplies the distributed cloud infrastructure. In particular, some such providers leverage the ability to control the addressing across the distributed cloud infrastructure to provide centralized address management of a distributed cloud namespace. In particular, some embodiments may provide a central namespace controller that manages the distributed cloud namespace in a judicious fashion during provisioning—avoiding address collisions between cloud computing systems 160 without performing additional per-packet, conditional network address translations.

Figure 5:
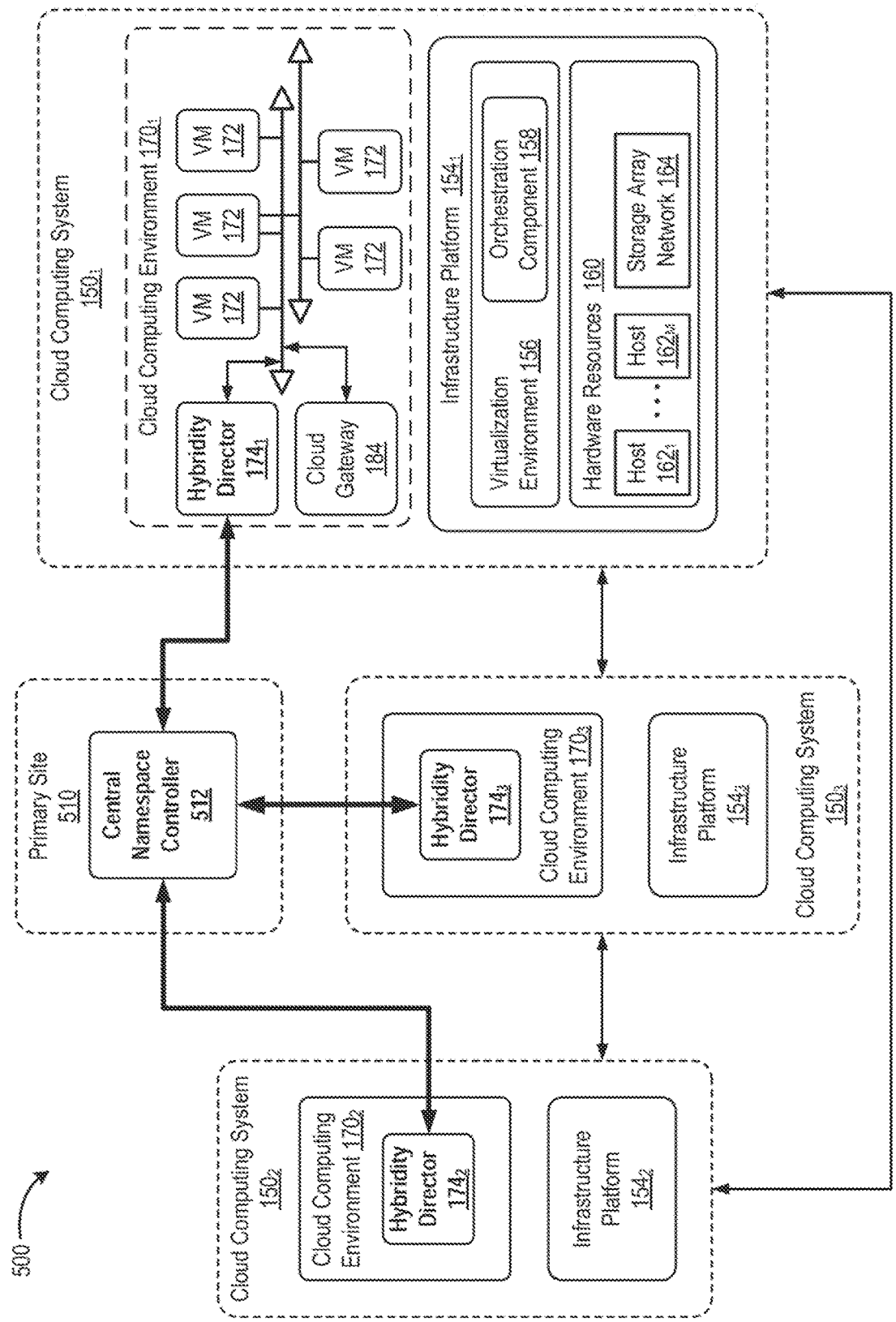
FIG. 5 is a conceptual diagram that illustrates a central namespace controller in a distributed cloud infrastructure.

FIG. 5 is a conceptual diagram that illustrates a central namespace controller 512 in a distributed cloud infrastructure 500. In addition to a primary site 510 that includes central namespace controller 512, multi-cloud computing system 500 includes, without limitation, three cloud computing systems 150. Each cloud computing system 150 may be at a different geographic location and is interconnected with other cloud computing systems 150 in any technically feasible fashion. For instance, cloud computing system $150_1$ may be on London, cloud computing system $150_2$ may be on New Jersey, cloud computing system $150_3$ may be in San Jose, and cloud computing systems 150 may be connected via the Internet. For explanatory purposes, FIG. 5 depicts connections between cloud computing systems 150 using thin arrows.

In alternate embodiments, distributed cloud infrastructure 500 may include any number of cloud computing systems 150 at any number of geographic locations. In some embodiments, primary site 510 is included in one of cloud computing systems 150. Further, each cloud computing system 150 may support any number of virtualized computing systems 102 (i.e., tenants), and distributed cloud infrastructure 500 may support cross-cloud private networks that interconnect different virtualized computing systems 102. For example, a corporation may have on-premises data centers in both New Jersey and San Jose connected via a common L2 backbone network (not shown in FIG. 5).

As shown, each cloud computing system 150 includes hybridity director 174. In addition to communicating with the corresponding hybrid cloud manager 132 in virtualized computing system 102, each hybridity director 174 communicates with central namespace controller 512. Each hybridity director 174 may communicate with central namespace controller 512 in any technically feasible fashion. For example, each hybridity director 174 may communicate with central namespace controller 512 using Internet-based traffic via a VPN tunnel, or alternatively, using a direct connection. For explanatory purposes, FIG. 5 depicts connections between each hybridity director 174 and central namespace controller 512 using thick arrows.

In general, central namespace controller 512 allocates addresses for networks and components that are provisioned and created by hybridity directors 174. More specifically, central namespace controller 512 judiciously assigns addresses in a distributed cloud address space to ensure that components (e.g., VMs 172) that interact across multiple cloud computing systems 150 do not experience address collisions. In operation, as part of provisioning a network, hybridity director 174 coordinates with central namespace controller 512 to assign a VNI that is unique within a multi-cloud namespace. Subsequently, as part of creating a new VM 172 on the provisioned network, hybridity director 174 coordinates with central namespace controller 512 to assign a MAC address and IP address that are unique within the provisioned network.

Figure 6B:
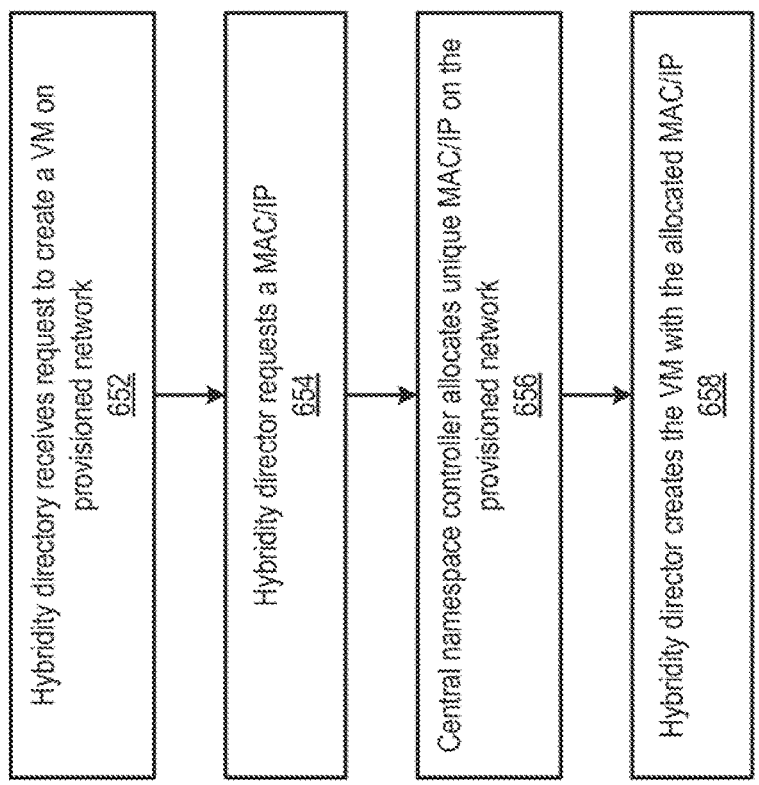
FIG. 6B depicts a flow diagram of method steps for managing a distributed cloud namespace when creating a virtual machine in a distributed cloud infrastructure.
Figure 6A:
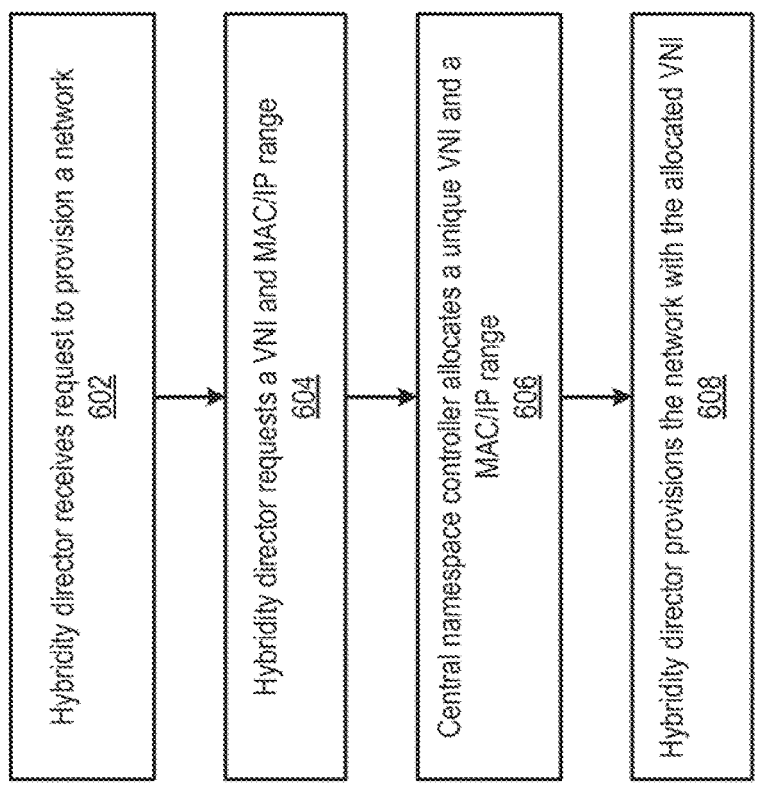
FIG. 6A depicts a flow diagram of method steps for managing a distributed cloud namespace when provisioning a network in a distributed cloud infrastructure.

FIG. 6A depicts a flow diagram of method steps for managing a distributed cloud namespace when provisioning a network in a distributed cloud infrastructure. Although the steps in this method describe provisioning using MAC addresses, IP addresses, and VNIs, similar steps may be implemented to enable provisioning using alternative protocols. For instance, in some embodiments, provisioning may use VLANs instead of VNIs to identify networks.

This method begins at step 602 where hybridity director 174 receives a request to provision a network. Such a request may be generated in any technically feasible fashion, such as from user input to a graphical user interface or an application programming interface. At step 604, hybridity director 174 sends a request for a VNI, a MAC address range, and an IP address range to the central namespace controller 512 that manages a distributed cloud namespace. In response, at step 606, central namespace controller 512 selects a VNI that is unique within the distributed cloud namespace managed by central namespace controller 512.

As part of step 606, central namespace controller 512 also assigns MAC and IP address ranges that are unique within the network specified by the VNI. Because central namespace controller 512 assigns MAC and IP address ranges that are unique within the network, together central namespace controller 512 and hybridity directors 174 enable communications via tenant-specific networks that spans multiple cloud computing systems 150—without provoking intra-tenant addressing collisions. However, the assigned MAC and IP address ranges are not necessarily unique within the distributed cloud namespace. Advantageously, by allowing MAC and IP address ranges on different networks to overlap, central namespace controller 512 optimizes the use of the limited available addresses in the distributed cloud namespace.

After central name space controller 512 provides the assigned VNI and the assigned MAC and IP address ranges, the hybridity director 174 provisions the network specified by the VNI with the specified MAC and IP address range (step 608). Since the VNI and MAC and IP address ranges are centrally allocated, cloud computing systems 150 at different sites (managed by different hybridity directors 174), flexibly share the distributed cloud namespace.

FIG. 6B depicts a flow diagram of method steps for managing a distributed cloud namespace when creating a virtual machine in a distributed cloud infrastructure. For explanatory purposes, the context of this method is that hybridity director 174 has already provisioned a network within the distributed cloud namespace. In general, the network will be provisioned with a VNI that is unique within the distributed cloud namespace and MAC and IP address ranges that are unique within the network. The network may be provisioned in any technically feasible fashion, such as using the method steps described in FIG. 6A. Although the steps in this method describes creating VMs 172 addressed using MAC addresses. IP addresses, and VNIs, similar steps may be implemented to create VMs 172 addressed using alternative protocols.

This method begins at step 652 where hybridity director 174 receives a request to create VM 172 on a provisioned network. Such a request may be generated in any technically feasible fashion, such as from user input to a graphical user interface or an application programming interface. Further such a request may be implied as a second step in a request to provision a network and create VM 172 on the newly provisioned network.

At step 654, hybridity director 174 requests allocation of a MAC address and corresponding IP address on a network specified by a VNI within a distributed cloud namespace that is managed by central namespace controller 512. In response, at step 656, central namespace controller 512 selects a MAC address and an IP address that are both unique within the network specified by the VNI and also lie within the MAC and IP ranges defined for the provisioned network. In some embodiments, central namespace controller 512 dynamically adjusts the MAC and IP ranges for each network based on network-specific demand. Such MAC and IP ranges enable as-needed allocation of namespace resources, thereby optimizing the usage of the distributed cloud namespace across multiple networks and multiple cloud computing systems 150 compared to pre-defined allocation schemes. In some embodiments, MAC and IP ranges may be fragmented.

At step 658, hybridity director 172 creates VM 172, specifying the assigned MAC and IP addresses received from central name space controller 512. Advantageously, since the VNI, MAC addresses, and IP addresses are centrally allocated, cloud computing systems 150 at different sites (managed by different hybridity directors 174) flexibly share the multi-tenant network namespace without address overlaps within the namespace. Further, because distributed cloud computing infrastructure 500 only incurs address management overhead during provision time of networks and VMs 172, not inline per-packet, overall processing time is optimized across distributed cloud infrastructure 500.

In some embodiments, distributed cloud infrastructure 500 may be configured to provide MAC and IP addresses that are unique within Internet 240. In such embodiments, distributed cloud infrastructure 500 may provide unique MAC addresses for MAC network address translations as described in FIGS. 2, 3, and 4.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. As used herein, the term "container" refers generically to both virtual machines and OS-less containers.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of supporting independent addressing for multiple tenants in a cloud computing system, comprising:
   for each tenant, configuring a private network between the tenant and the cloud computing system, wherein the private network is managed by a tenant-facing cloud gateway;
   configuring the tenant-facing cloud gateways to preserve source media access control (MAC) addresses of packets originating from the cloud computing system to the private networks of the multiple tenants and to not perform MAC address translation on the packets, thereby allowing packets for different tenants to have same source MAC address in the cloud computing system;
   configuring a multi-tenant cloud gateway to a public network to translate the source MAC addresses of packets originating from the cloud computing system to the public network to MAC addresses that are unique within the public network;
   migrating a container with a particular MAC address from a particular private network of the multiple tenants to the cloud computing system that includes an existing container with the same particular MAC address, wherein each of the containers is one of a virtual machine and an operating system-less container;
   using the tenant-facing cloud gateway for the particular private network to transmit the packets originating from the cloud computing system to the particular private network without performing the MAC address translation; and
   using the multi-tenant cloud gateway to the public network to transmit the packets originating from the cloud computing system to the public network by performing the MAC address translation.

2. The method of claim 1, wherein the private network is delineated by a virtual network identifier (VNI) or a virtual local area network (VLAN) identifier.

3. The method of claim 1, wherein configuring the private network comprises provisioning the private network for a virtualized computing system.

4. The method of claim 3, wherein a first source address specifies a particular virtual machine that is included in the private network and is running in a host in the cloud computing system.

5. The method of claim 3, wherein a particular virtual machine is running on a host in the virtualized computing system and a virtual network interface card of the particular virtual machine has a virtual media access control (MAC) address, and further comprising:
   migrating the particular virtual machine from the host in the virtualized computing system to a host in the cloud computing system, without altering the virtual MAC address of the virtual network interface card of the particular virtual machine.

6. The method of claim 1, wherein the public network is the Internet, and translating comprises mapping the destination address to an Internet-facing address.

7. The method of claim 1, wherein the private network is a layer-2 (L2) network that is provisioned for a virtualized computing system, and the private network spans both the virtualized computing system and a virtual data center within the cloud computing system.

8. A non-transitory computer readable storage medium comprising instructions, which when executed in a multi-tenant cloud computing system causes the computing system to carry out the steps of:
for each tenant, configuring a private network between the tenant and the cloud computing system, wherein the private network is managed by a tenant-facing cloud gateway;
configuring the tenant-facing cloud gateways to preserve source media access control (MAC) addresses of packets originating from the cloud computing system to the private networks of the multiple tenants and to not perform MAC address translation on the packets, thereby allowing packets for different tenants to have same source MAC address in the cloud computing system;
configuring a multi-tenant cloud gateway to a public network to translate the source MAC addresses of packets originating from the cloud computing system to the public network to MAC addresses that are unique within the public network;
migrating a container with a particular MAC address from a particular private network of the multiple tenants to the cloud computing system that includes an existing container with the same particular MAC address, wherein each of the containers is one of a virtual machine and an operating system-less container;
using the tenant-facing cloud gateway for the particular private network to transmit the packets originating from the cloud computing system to the particular private network without performing the MAC address translation; and
using the multi-tenant cloud gateway to the public network to transmit the packets originating from the cloud computing system to the public network by performing the MAC address translation.

9. The non-transitory computer readable storage medium of claim 8, wherein the private network is delineated by a virtual network identifier (VNI) or a virtual local area network (VLAN) identifier.

10. The non-transitory computer readable storage medium of claim 8, wherein configuring the private network comprises provisioning the private network for a virtualized computing system.

11. The non-transitory computer readable storage medium of claim 10, wherein a first source address specifies a particular virtual machine that is included in the private network and is running in a host in the cloud computing system.

12. The non-transitory computer readable storage medium of claim 10, wherein a particular virtual machine is running on a host in the virtualized computing system and a virtual network interface card of the particular virtual machine has a virtual media access control (MAC) address, and further comprising:
migrating the particular virtual machine from the host in the virtualized computing system to a host in the multi-tenant cloud computing system, without altering the virtual MAC address of the virtual network interface card of the particular virtual machine.

13. The non-transitory computer readable storage medium of claim 8, wherein the private network is a layer-2 (L2) network that is provisioned for a virtualized computing system, and the private network spans both the virtualized computing system and a virtual data center within the cloud computing system.

14. A hybrid cloud computing system comprising:
virtualized computing systems that each include a plurality of physical host computers in which one or more virtual machines are running, wherein each virtualized computing system corresponds to a different tenant;
a cloud computing system that includes a plurality of physical host computers in which one or more virtual machines are running; and
a hybridity director that allocate resources of cloud computing system between the tenants, wherein the hybridity director is configured to:
for each tenant, configure a private network between the corresponding virtualized computing system and the cloud computing system, wherein the private network is managed by a tenant-facing cloud gateway;
configure the tenant-facing cloud gateways to preserve source media access control (MAC) addresses of packets originating from the cloud computing system to the private networks of the multiple tenants and to not perform MAC address translation on the packets, thereby allowing packets for different tenants to have same source MAC address in the cloud computing system;
configure a multi-tenant cloud gateway to a public network to translate the source MAC addresses of packets originating from the cloud computing system to the public network to MAC addresses that are unique within the public network;
migrate a virtual machine with a particular MAC address from a particular private network of the multiple tenants to the cloud computing system that includes an existing container with the same particular MAC address;
use the tenant-facing cloud gateway for the particular private network to transmit the packets originating from the cloud computing system to the particular private network without performing the MAC address translation; and
use the multi-tenant cloud gateway to the public network to transmit the packets originating from the cloud computing system to the public network by performing the MAC address translation.

15. The hybrid cloud computing system of claim 14, wherein the private network is delineated by a virtual network identifier (VNI) or a virtual local area network (VLAN) identifier.

16. The hybrid cloud computing system of claim 14, wherein a first source address specifies a particular virtual machine that is included in a first private network and is running in a physical host computer in the cloud computing system.

17. The hybrid cloud computing system of claim 14, wherein the private network is a layer-2 (L2) network that spans both a first virtualized computing system and a virtual data center within the cloud computing system.

* * * * *